United States Patent
Schindler

(10) Patent No.: US 7,818,591 B2
(45) Date of Patent: Oct. 19, 2010

(54) TECHNIQUES FOR MEASURING NETWORK CHANNEL RESISTIVE LOSS BETWEEN A POWER-SOURCING APPARATUS AND A POWERED DEVICE

(75) Inventor: Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 543 days.

(21) Appl. No.: 11/786,183

(22) Filed: Apr. 11, 2007

(65) Prior Publication Data

US 2008/0252307 A1 Oct. 16, 2008

(51) Int. Cl.
*G06F 1/00* (2006.01)
*G01R 27/08* (2006.01)

(52) U.S. Cl. .................. 713/300; 324/522; 324/691; 324/713; 455/343.5; 307/38

(58) Field of Classification Search .................. 713/300; 324/522, 691, 713; 455/343.5; 307/38
See application file for complete search history.

(56) References Cited

U.S. PATENT DOCUMENTS

| | | | |
|---|---|---|---|
| 3,922,659 A | 11/1975 | Dighe | |
| 4,370,562 A | 1/1983 | Palazzetti et al. | |
| 5,148,144 A | 9/1992 | Sutterlin et al. | |
| 5,550,917 A | 8/1996 | Tallec | |
| 5,625,621 A | 4/1997 | Christensen et al. | |
| 5,642,052 A | 6/1997 | Earle | |
| 5,670,937 A | 9/1997 | Right et al. | |
| 5,680,397 A | 10/1997 | Christensen et al. | |
| 5,784,237 A | 7/1998 | Velez | |
| 5,842,027 A | 11/1998 | Oprescu et al. | |
| 5,912,963 A | 6/1999 | Begeja et al. | |
| 5,936,442 A | 8/1999 | Liu et al. | |
| 5,991,885 A | 11/1999 | Chang et al. | |
| 5,994,998 A | 11/1999 | Fisher et al. | |
| 6,016,519 A | 1/2000 | Chida et al. | |
| 6,040,969 A | 3/2000 | Winch et al. | |
| 6,098,174 A | 8/2000 | Baron et al. | |

(Continued)

FOREIGN PATENT DOCUMENTS

EP 0777357 A2 4/1997

(Continued)

OTHER PUBLICATIONS

John Joan, DC power from Ethernet, Jan. 29, 2002, p. 1.

(Continued)

*Primary Examiner*—Abdelmoniem Elamin
(74) *Attorney, Agent, or Firm*—BainwoodHuang

(57) ABSTRACT

A method and apparatus are provided for determining resistive power loss through a channel between Power Sourcing Equipment (PSE) and a Powered Device (PD). The method includes (1) receiving indication that a PSE signal measurement is available from the PSE or a PD signal measurement is available from the PD, (2) selecting, as an input parameter to a processing operation, at least one of the PSE signal measurement or the PD signal measurement, (3) performing the processing operation to calculate a resistance value indicative of the resistive power loss through the channel between the PSE and PD based on the input parameter, and (4) outputting the resistive power loss value as a result of carrying out the processing operation.

19 Claims, 5 Drawing Sheets

U.S. PATENT DOCUMENTS

| | | |
|---|---|---|
| 6,115,468 A | 9/2000 | De Nicolo |
| 6,140,911 A | 10/2000 | Fisher et al. |
| 6,175,556 B1 | 1/2001 | Allen, Jr. et al. |
| 6,233,235 B1 | 5/2001 | Burke et al. |
| 6,246,748 B1 | 6/2001 | Yano |
| 6,317,839 B1 | 11/2001 | Wells |
| 6,345,047 B1 | 2/2002 | Regnier |
| 6,348,874 B1 | 2/2002 | Cole et al. |
| 6,357,011 B2 | 3/2002 | Gilbert |
| 6,366,143 B1 | 4/2002 | Liu et al. |
| 6,393,050 B1 | 5/2002 | Liu |
| 6,473,608 B1 | 10/2002 | Lehr et al. |
| 6,496,103 B1 | 12/2002 | Weiss et al. |
| 6,526,516 B1 | 2/2003 | Ishikawa et al. |
| 6,535,983 B1 | 3/2003 | McCormack et al. |
| 6,546,494 B1 | 4/2003 | Jackson et al. |
| 6,629,248 B1 | 9/2003 | Stachura |
| 6,674,271 B2 | 1/2004 | Choo et al. |
| 6,701,443 B1 | 3/2004 | Bell |
| 6,874,093 B2 | 3/2005 | Bell |
| 6,952,785 B1 | 10/2005 | Diab et al. |
| 6,985,713 B2 | 1/2006 | Lehr et al. |
| 2003/0005339 A1 | 1/2003 | Cohen et al. |
| 2003/0135766 A1 | 7/2003 | Syskowski et al. |
| 2004/0025066 A1 | 2/2004 | Jackson et al. |
| 2004/0148532 A1 | 7/2004 | Bell |
| 2004/0230846 A1 | 11/2004 | Mancey et al. |
| 2005/0102544 A1 | 5/2005 | Brewer et al. |
| 2005/0262364 A1 | 11/2005 | Diab et al. |
| 2005/0268120 A1 | 12/2005 | Schindler et al. |
| 2005/0283627 A1 | 12/2005 | Diab et al. |
| 2006/0143583 A1 | 6/2006 | Diab et al. |
| 2007/0064922 A1 | 3/2007 | Schindler |
| 2007/0257780 A1 | 11/2007 | Schindler |
| 2008/0164890 A1* | 7/2008 | Admon et al. .............. 324/713 |

FOREIGN PATENT DOCUMENTS

| | | |
|---|---|---|
| GB | 2034055 A | 5/1980 |
| JP | 200214964 A | 8/2000 |

OTHER PUBLICATIONS

Stephen Foskett, Stephen Foskett's Power Over Ethernet (PoE) Calculator Version 1.01, Jun. 21, 2003, pp. 2.

Galit Mendelson, "Installing an IP Telephony Network Using Power over LAN," Online, (Nov. 3, 2002) pp. 1-10, XP002340946 Inet, Retrieved from the Internet: URL: <http://www.powerdsine.com/Documentation/WhitePapers/Installing_IP_Telephony_network_with_PoL.pdf>, retrieved on Aug. 16, 2005, p. 7, line 16—line 19.

Schindler, et al., "Inline Power Policing," U.S. Appl. No. 11/509,947, filed Aug. 25, 2006.

* cited by examiner

TECHNIQUES FOR MEASURING NETWORK CHANNEL RESISTIVE LOSS BETWEEN A POWER-SOURCING APPARATUS AND A POWERED DEVICE

BACKGROUND

A typical phantom (or inline) power communications system includes power-sourcing communications equipment and a set of remotely-powered network devices that connect to the power-sourcing communications equipment though a set of network cables. The power-sourcing communications equipment includes a power supply and transmit/receive circuitry. During operation, the power supply provides power to the remotely-powered network devices through the network cables, and the transmit/receive circuitry concurrently exchanges data with the remotely-powered network devices through the same network cables. Accordingly, the users of the remotely-powered network devices are not burdened with having to separately connect their devices to power sources (e.g., wall outlets).

Several conventional approaches exist for provisioning power to remotely-powered network devices over cables having some amount of resistance. One conventional approach, which is hereinafter referred to as the conventional "over-provisioning approach", involves the equipment manufacture designing the power-sourcing communications equipment for a worst-case scenario in which the power-sourcing communications equipment connects to a maximum number of remotely-powered network devices through network cables at their maximum specified lengths (e.g., 100 meters in accordance with the IEEE 802.3af standard). Under this approach, the equipment manufacturer provisions particular characteristics of the power-sourcing communications equipment for a maximum power draw (e.g., maximum power supplied to each remote device and maximum power loss over each network cable due to the network cables being at their maximum lengths). For example, the manufacturer makes sure the power supply is large enough, that there are enough circuit board power planes or that the circuit board power planes and power converters are robust enough to carry worst case current, and that the fan assembly is strong enough to provide adequate cooling. Another conventional approach, which is hereinafter referred to as the conventional "statistical methods" approach, involves the equipment manufacturer designing the power-sourcing communications equipment based on probable uses of the equipment in the field. For example, the manufacturer may offer two models of power-sourcing communications equipment, namely, a lower-end model which is designed for lower power demand situations, and a higher-end model which is designed for higher power demand situation, and then rely on the customer to select the best-suited model for a particular installation location. There are also industry standards which attempt to provide guidelines for manufacturing certain types of power-sourcing communications equipment. For example, the IEEE 802.3af standard, or the newer IEEE 802.3-2005 standard, which is also called the "Power over Ethernet" (PoE) standard, defines ways to build Ethernet power-sourcing equipment and powered terminals. In particular, the IEEE 802.3-2005 standard identifies ways to deliver certain electrical features (e.g., 48 volts) of D.C. power over unshielded twisted-pair wiring (e.g., Category 3, 5, 5e or 6 network cables, patch cables, patch-panels, outlets and connecting hardware) to a variety of Ethernet devices or terminals such as IP phones, wireless LAN access points, laptop computers and Web cameras.

In the context of the IEEE 802.3-2005 PoE standard where the power-sourcing communications equipment is called the PSE (Power Sourcing Equipment) and the remote device is called the PD (Powered Device), some PSEs include Time Domain Reflectometry circuitry which determines the integrity of the cables, i.e., the data channels.

BRIEF DESCRIPTION OF THE DRAWINGS

Objects, features, and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Certain embodiments of the present invention provide improved methods for measuring resistive power loss over cables connecting a Power Sourcing Equipment (PSE) to a Powered Device (PD) in order to enable the PSE to more precisely provide the correct amount of power to the PD. Other embodiments provide for an apparatus for performing the aforementioned methods.

In one embodiment, a method is provided for calculating resistive power loss over a cable by taking multiple measurements at a PD at different electrical loads. This yields a very accurate result.

In another embodiment, a general method is provided for determining resistive power loss over a cable. In this method, the PSE and PD negotiate their respective capabilities and determine which of several methods for calculating the resistive power loss ought to be applied. In one embodiment, the most accurate available method is performed, while in an alternative embodiment, various factors are taken into consideration, including accuracy, speed, etc.

In another embodiment, an apparatus for performing the general method is provided. In one embodiment, the device is a PD, while in an alternative embodiment, the device is a PSE.

Description of Example Embodiments

Embodiments of the invention are directed to techniques for determining power demands using measured network channel resistance. Such techniques enable accurate identification of power demands for powering remote devices through data communications cables, and thus alleviate the need to over-provision power and other resources, or rely on statistical methods, as in conventional approaches.

Figure 1:
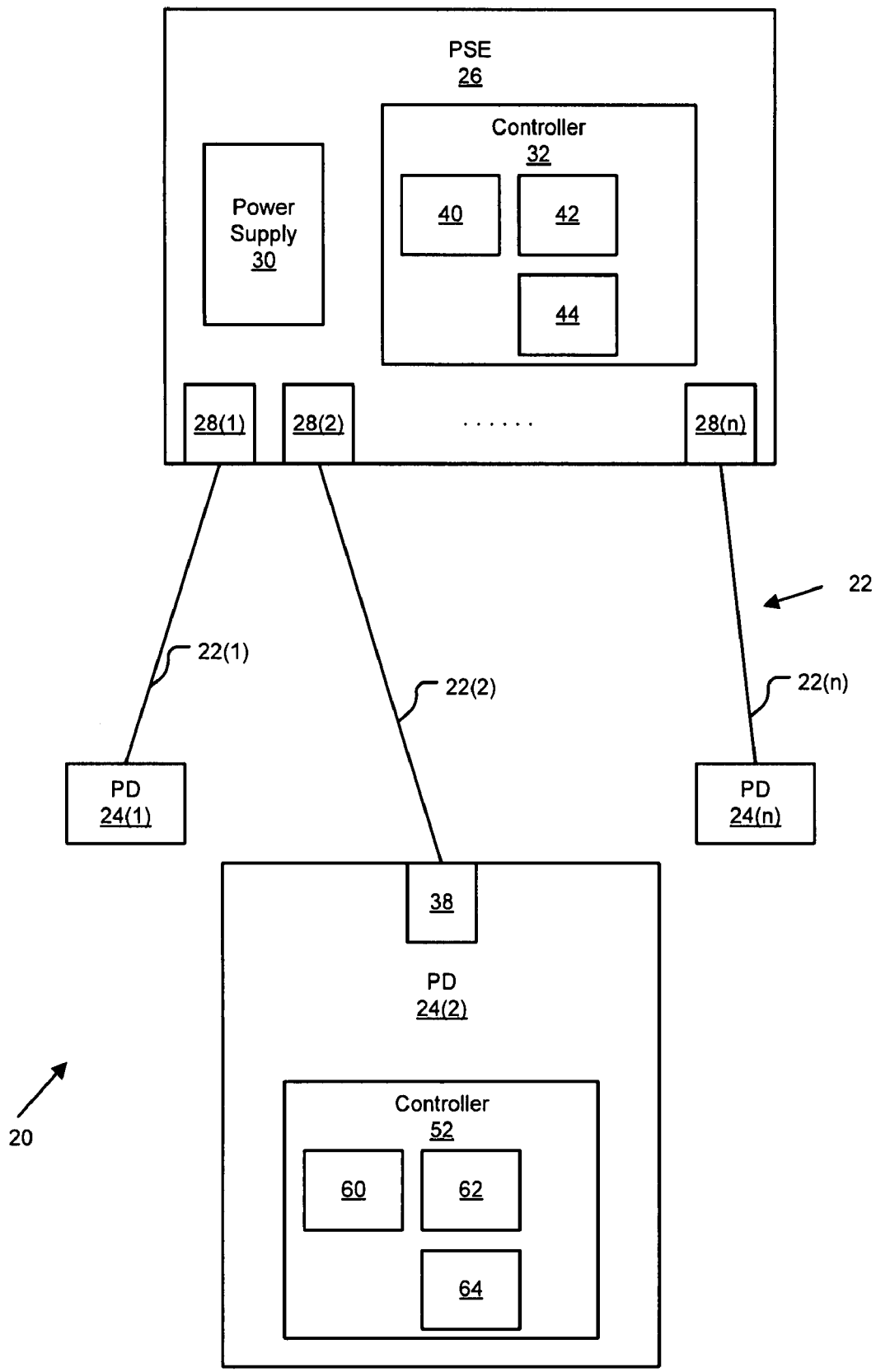
FIG. 1 illustrates a communication system for use in embodiments of the invention.

FIG. 1 shows a communications system 20 (e.g., a VoIP system) which is suitable for use by various embodiments of the invention. The system 20 includes a power source, such as a PSE 26, PDs 24(1), 24(2), ..., 24(n) (generally PDs 24), and network connection cables 22(1), 22(2), ..., 22(n) (generally network connection cables 22) therebetween. Each network cable 22 is a channel between the PSE 26 and a particular PD 24.

The PSE 26 and PD 24 are, in one embodiment, Ethernet devices operating according to the 802.3-2005 PoE standard. In that case, the connection cables 22 are Ethernet cables, which also carry D.C. electric current. Current is carried in a loop (over two or more wires contained within the cable 22) between the PSE 26, the PD 24, and back to the PSE 26 again.

PSE 26 contains a power supply 30, a controller 32, and network interfaces 28(1), 28(2), ..., 28(n) (generally network interfaces 28). The controller 32 has a processor 42, memory 44, and, in some embodiments, local measurement circuitry 40.

Figure 2:
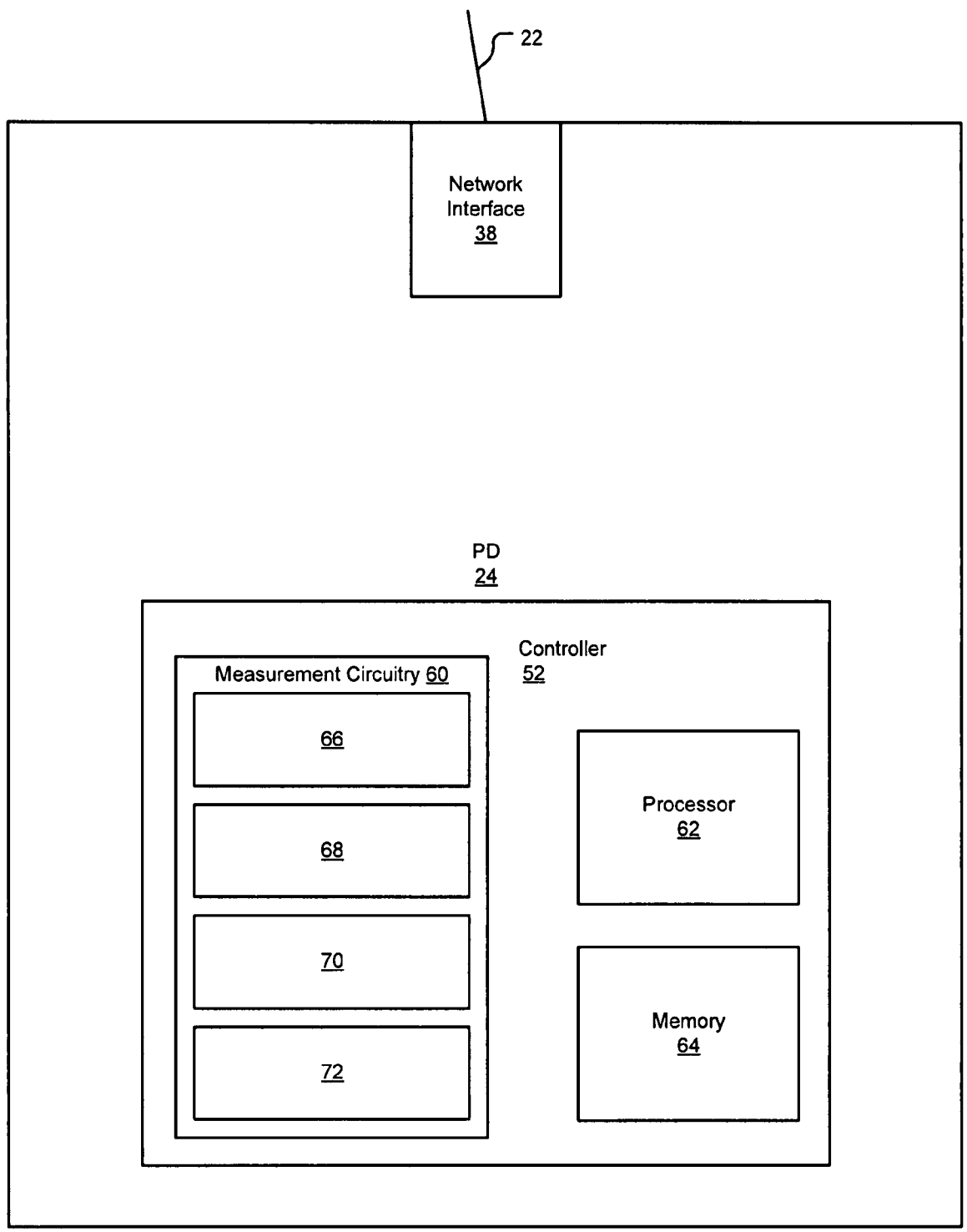
FIG. 2 illustrates a Powered Device for use in embodiments of the invention.

PD 24(2), which is connected to PSE 26 by a network connection 22(2) is depicted in greater detail in FIG. 2.

FIG. 2 depicts a PD 24 for use in an embodiment of the invention. The PD 24 contains a network interface 38 and a controller 52. The controller 52 contains a processor 62, memory 64, and local measurement circuitry 60. The local measurement circuitry 60 contains logic 66 for producing at least two different test loads, current measuring circuitry 68, voltage measuring circuitry 70, and an analog to digital converter (ADC) 72. The voltage measuring circuitry 70 is capable of measuring local voltage, which is the voltage drop across the PD 24. The current measuring circuitry 68 is capable of measuring local current, which is the current at the PD 24 in the circuit connecting the PD 24 and the PSE 26 (i.e., the connection cable 22 together with the PD 24 and the PSE 26).

Figure 3:
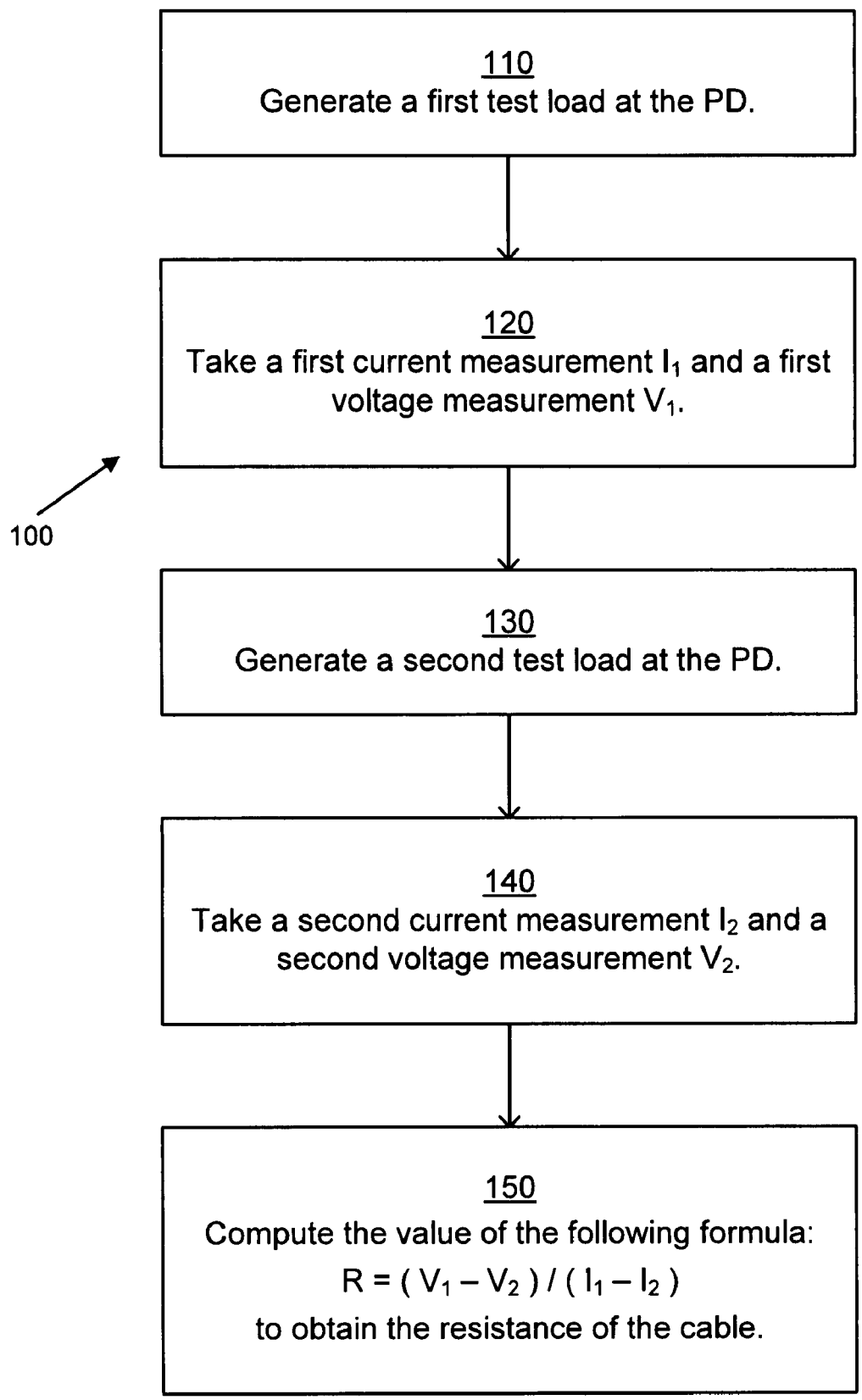
FIG. 3 illustrates a method, which is an embodiment of the invention.

One embodiment of the invention is depicted in FIG. 3. A method 100 is shown for calculating the resistance over a network channel in the system 20 of FIG. 1, using the PD 24 of FIG. 2. The network channel resistance may be due in part to resistance over the network cable 22, or to connector, patch panel, or other path resistances. In this method 100, the local measurement circuitry 60 of the PD 24 generates a first test load, using logic 66 (Step 110). This load causes current to flow across the connection cable 22 between the PSE 26 and the PD 24. The local measurement circuitry 60 then makes a first current measurement $I_1$ using current measuring circuitry 68 and a first voltage measurement $V_1$ using voltage measuring circuitry 70 (Step 120). The first current measurement $I_1$ may be performed anywhere along the circuit connecting the PSE 26 to the PD 24. The first voltage measurement $V_1$ is a measure of the potential drop across the PD 24. Then, the local measurement circuitry 60 of the PD 24 generates a second test load, using logic 66 (Step 130). The local measurement circuitry 60 then makes a second current measurement $I_2$ using current measuring circuitry 66 and a second voltage measurement $V_2$ using voltage measuring circuitry 68 (Step 140). The second current measurement $I_2$ may be performed anywhere along the circuit connecting the PSE 26 to the PD 24. The second voltage measurement $V_2$ is a measure of the potential drop across the PD.

The values $I_1$, $I_2$, $V_1$, and $V_2$ are digitized by means of the ADC 72 and are stored in memory 64. The values stored in memory are then operated on by the controller 52. The controller 52 computes the value of the following formula:

$$R = \frac{V_1 - V_2}{I_2 - I_1} \quad (1)$$

(Step 150). Although each of the values $I_1$, $I_2$, $V_1$, and $V_2$ were created using the same ADC 72, any systemic error in the ADC 72 is cancelled out by the subtractions and divisions. The subtractions eliminate any potential offset errors, while the division eliminates any gain errors. R, thus calculated, is the resistance over the channel. The resistive power loss for any particular load over a channel may be calculated by multiplying the resistance R by the square of the current on the channel for that load. The PD 24 is then able to request an exact power requirement from the PSE 26 by summing together the power required by the PD 24 and the calculated resistive power loss over the channel. This measurement technique is accurate to within approximately 3%.

It should be noted that all communication between the PD 24 and the PSE 26 typically takes place over the network. Thus, if the network cables 22 are Ethernet cables, a network signal is utilized over those lines. Preferably, a standard layer 2 protocol is utilized for this communication, for example the Cisco Discovery Protocol (CDP).

Figure 4:
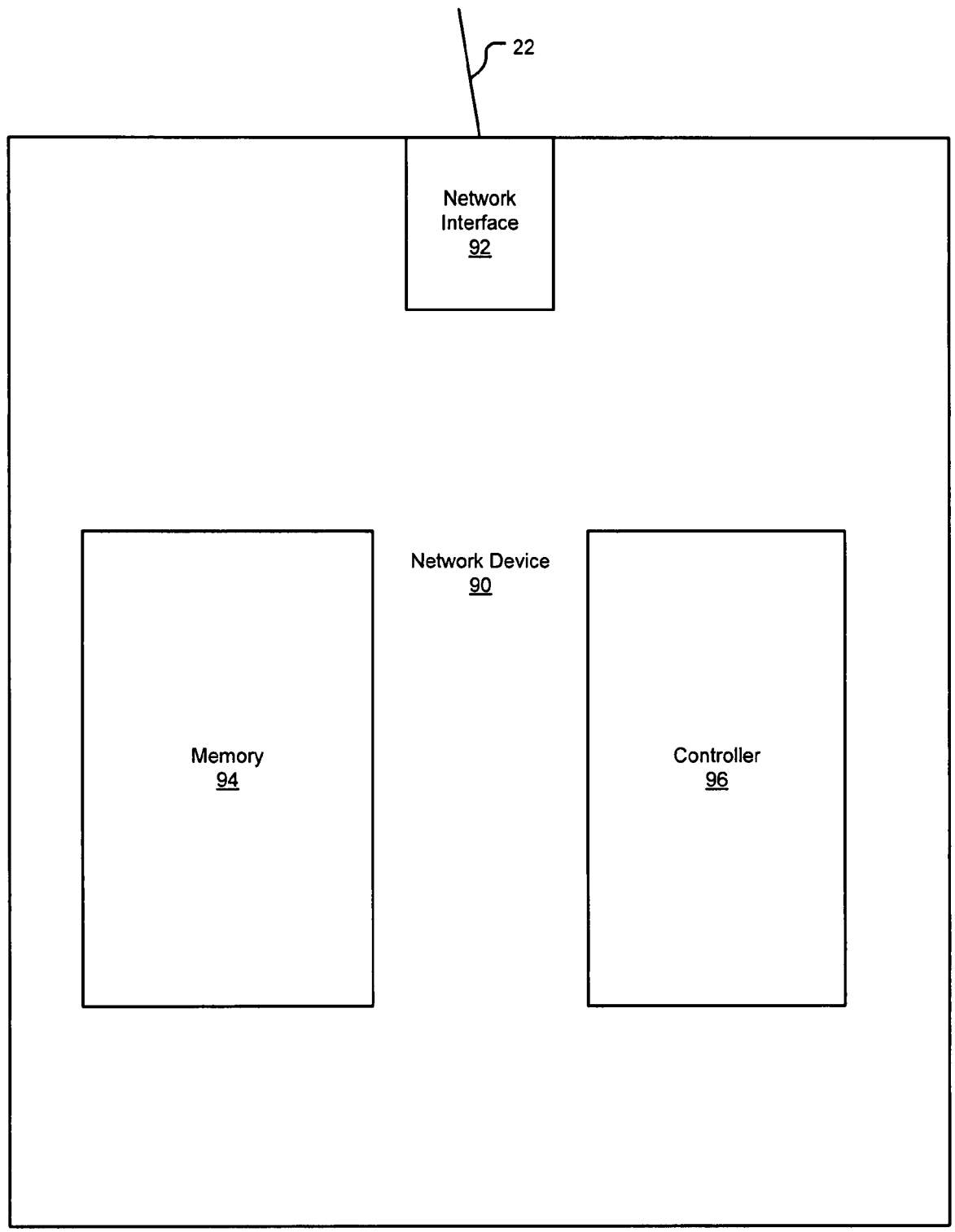
FIG. 4 illustrates a network device, which is an embodiment of the invention and which also may be used in practicing other embodiments of the invention.

Another embodiment is depicted in FIG. 4. Depicted is a network device 90, having a network interface 92, memory 94, and a controller 96. In one embodiment, the network device 90 is a PD 24. In an alternative embodiment, the network device 90 is the PSE 26.

Figure 5:
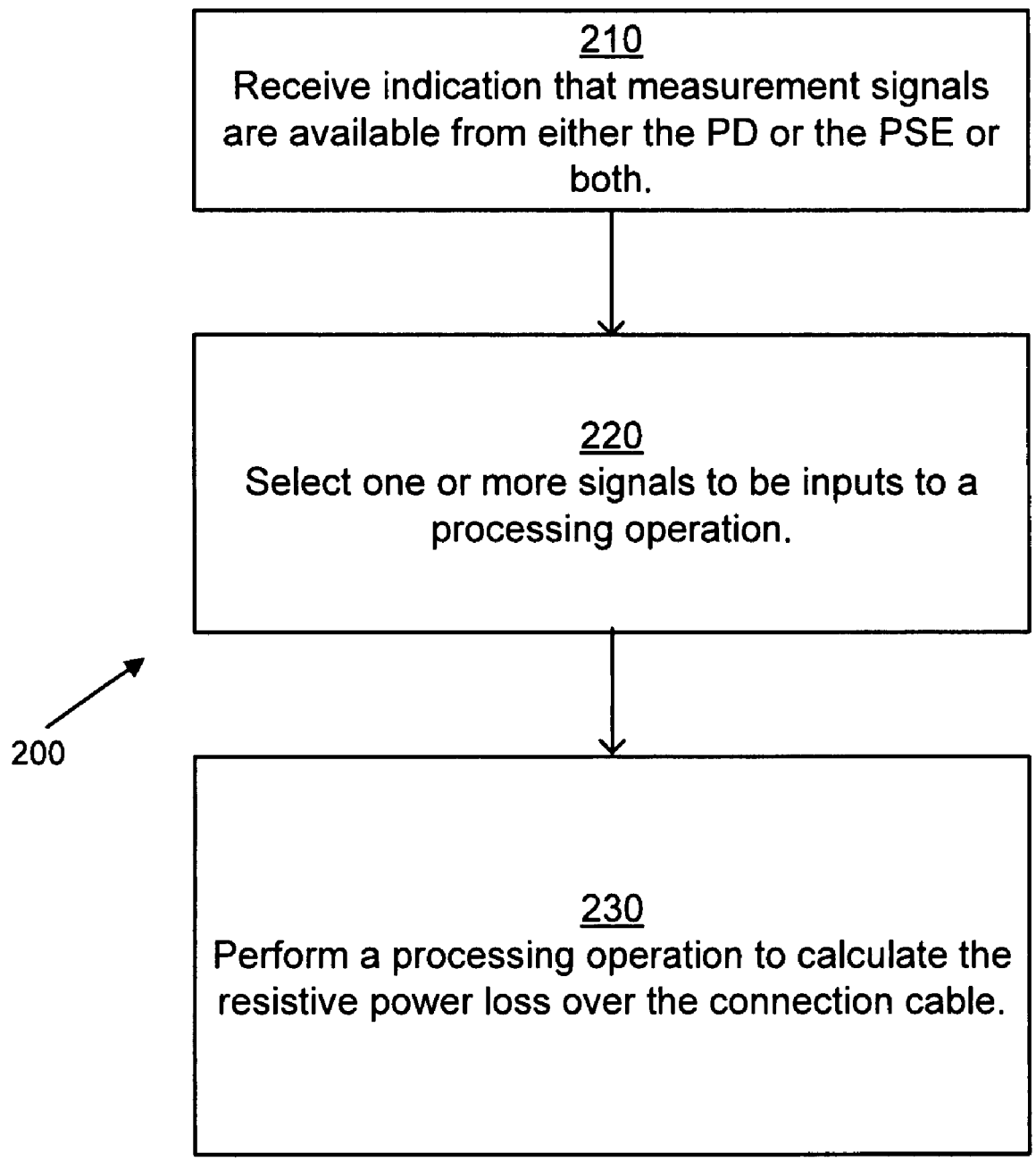
FIG. 5 illustrates a method, which is an embodiment of the invention.

The controller 96 performs a method 200, as depicted in FIG. 5. First, the controller 96 receives indication (for example, according to the CDP) that measurement signals are available from either the PD 24 or the PSE 26 or both (step 210). Based on the signal availability and other factors, the controller 96 selects one or more signals to be inputs to a processing operation (step 220). The controller 96 then performs a processing operation to calculate the resistive power loss over the connection cable 22 (step 230). This processing operation is typically performed by first calculating the resistance R of the cable 22 and then multiplying that resistance R by the square of the current passing through the circuit.

The controller 96 typically selects signals as inputs based on the accuracy of the methods of calculation available based on the chosen input signals. In an alternative embodiment, the controller 96 may instead use alternative factors, such as the speed of the method in a time-critical case. In some embodiments, the most accurate method available may be the method 100 described above in connection with FIGS. 2 and 3. Therefore, if the PD 24 is capable of creating multiple test loads and of performing local measurements of current and voltage as depicted in FIGS. 2-3, then the controller 96 typically selects the measurement signals from the PD 24 and performs the method 100 as described above and as depicted in FIG. 3 in order to calculate the resistance of the cable 22. Recall that the controller 96 resides on the network device 90, which may reside in either the PSE 26 or the PD 24.

But, if the PD 24 is not capable of creating multiple test loads and of performing local measurements of current and voltage as depicted in FIG. 2, then the controller 96 determines an alternative method to use to calculate or estimate the resistance R of the connection cable 22.

In one embodiment, if the PSE 26 is equipped with local measurement circuitry 40 to measure current and voltage and if the PSE 26 is capable of providing power at least 2 voltages, then the controller 96 selects the signals from the PSE 26. In that case, the PSE 26 first provides a first voltage, and the PSE measures voltage $V_1$ and current $I_1$. Then, the PSE 26 provides a second voltage, and the PSE measures voltage $V_2$ and current $I_2$. Then, with $P_1=V_1 \times I_1$ and $P_2=V_2 \times I_2$, the following formula is calculated:

$$R = \frac{P_1 - P_2}{I_1^2 - I_2^2} \quad (2)$$

This formula provides a measurement of the resistance R of the connection cable 22 that is accurate to approximately 5%.

It should be noted that errors may be introduced into this calculation if the resistance across the PD 24 varies with respect to the current load. Most PDs use a DC-DC converter (to convert the ~48V PoE voltage to a usable circuit voltage, such as 3.3V). The DC-DC converter may have an efficiency that varies with the input voltage. In that case, some of the resistance R, calculated according to formula 2, may be attributable to the PD 24, rather than to the cable 22. In order to account for this error, the efficiency of the PD 24 may be pre-measured, obtaining a PD 24 resistance as a function of load. The PD 24 would then communicate, together with each power measurement, the calculated resistance of the PD 24 at the given load. Such communication would occur, for example, according to the CDP, or another similar protocol. Formula 2 could then be modified to subtract the resistance attributable to the PD 24 at a given load when calculating the resistance of the channel.

In one embodiment, if the PSE 26 is not equipped to provide power at multiple voltages, but the PD 24 is equipped to output its known power load $P_{PD}$, then the controller 96 selects inputs from both the PSE 26 and the PD 24. These inputs include the current $I_{PSE}$ and the voltage $V_{PSE}$ measured by the local measurement circuitry 40 of the PSE 26, as well as the power load $P_{PD}$ provided by the PD 24. The controller then is able to calculate the resistance R of the connection cable 22 according to the following formula:

$$R = \frac{(I_{PSE} \times V_{PSE}) - P_{PD}}{I_{PSE}^2} \quad (3)$$

This formula provides a measurement that is accurate to about 20%.

This method is also susceptible to error if the resistance across the PD 24 varies with respect to the current load. One way to correct for this is if the PD 24 is capable of measuring its input voltage and the efficiency of the DC-DC converter is known as a function of voltage (as above). In that case, the PD 24 could modify its communicated power load $P_{PD}$ by subtracting any power loss attributable to the inefficiency of the DC-DC converter. Alternatively, if the PD 24 is not capable of measuring its input voltage, the PSE 26 can correct for the error attributable to the DC-DC converter of the PD 24 by using an iterative process. In that process, the PSE first calculates formula 3, and then calculates the voltage of the PD 24 by using the PSE 26 power $P_{PSE}$ and subtracting the estimated power loss over the channel ($I_{PSE}^2 \times R$) and then dividing the difference by the current $I_{PSE}$. Once the PD 24 voltage has thus been calculated, using the pre-determined efficiency of the DC-DC converter of the PD 24, the PSE 26 can estimate the resistance of the DC-DC converter of the PD 24 to refine its calculation of formula 3. This process may then be repeated iteratively to arrive at a precise result.

It should be noted that there may be errors in the ADC 72 of the PD. These errors may include offset errors and gain errors. Thus, the power used by the PD 24 $P_{PD}$ may be incorrect. If the PD 24 measures $P_{PD}$ by measuring the local voltage and current, gain and offset errors within the ADC 72 may be detected by measuring the voltage and current at two or more different loads (since the DC-DC converter consumes the same total power, regardless of the input voltage or current, when corrected for DC-DC converter efficiency).

In one embodiment, if the PSE 26 is equipped with Time Domain Reflectometry (TDR) circuitry, then the controller 96 may alternatively estimate the cable resistance by estimating the length L of the connection cable 22 through a TDR process and estimating the incremental per-unit-length resistance $R_I$ of the connection cable 22. $R_I$ may either be user-input, or it may be estimated according to the type of cable (e.g., category 3, 5, 5e, or 6 cable). The resistance R may then be estimated by the following formula:

$$R = L \times R_I \quad (4)$$

This formula provides an estimate that is accurate to about 30%.

In another embodiment, once the resistance R is calculated by any of the above-described means, the resistance R is compared to a pre-determined resistance value. For example, according to the proposed IEEE 802.3at (PoE Plus) standard, the maximum allowed channel resistance is 25 ohms. If the measured resistance R is less than 25 ohms, then the channel is better than worst-case, and the PSE 26 may then provide less power than would otherwise be required according to the worst-case estimates. But, if the measured resistance R is greater than 25 ohms, then it means that something is wrong with the system. For example, an inappropriate cable may be in use (e.g., CAT-3, since PoE Plus requires CAT-5e or higher), or a cable length may be too long, or there might be a faulty connection. In such a situation, in one embodiment, an error message is sent to a user indicating that the cables should be checked. In another embodiment, there is a threshold resistance (at least as high as the worst-case allowed resistance of 25 ohms, but possibly higher), above which the PSE 26 will refuse to provide power over the channel.

Thus, methods and apparatuses for computing the resistive power loss over a powered connection cable 22 in a communications system 20 are described.

While various embodiments of the invention have been particularly shown and described, it will be understood by those skilled in the art that various changes in form and details may be made therein without departing from the spirit and scope of the invention as defined by the appended claims.

For example, method 100 was described as utilizing two current measurements and two voltage measurements. However, additional measurements may be used to enhance the accuracy of the method. At each test load, it is possible that one of the measurements was in error. Thus, the current and voltage measurements at each test load may be performed two times. If the values differ by only a small amount (or not at all), then the values may be averaged to provide a more robust value. If the values differ by more than a threshold amount, then additional measurements may be performed to determine which of the previous measurements was in error (e.g., caused by a spike on the line).

What is claimed is:

1. A method for determining resistive power loss through a channel between Power Sourcing Equipment (PSE) and a Powered Device (PD), the method comprising:
   receiving indication that a PSE signal measurement is available from the PSE or a PD signal measurement is available from the PD;

selecting, as an input parameter to a processing operation, at least one of the PSE signal measurement or the PD signal measurement; and performing the processing operation to calculate a resistance value indicative of the resistive power loss through the channel between the PSE and PD based on the input parameter;

wherein selecting comprises choosing a method for calculating resistive power loss based on the availability of the PSE signal measurement and the PD signal measurement and picking an input parameter associated with the chosen method.

2. A method as in claim 1 wherein selecting further includes choosing a method that is most accurate among a variety of methods.

3. A method as in claim 2 wherein choosing a method further includes:

if a PD signal measurement is available and if the PD is capable of measuring local voltage and current for two different load values, then selecting as the input parameter the PD signal measurement.

4. A method as in claim 3 wherein receiving includes:

obtaining the PD signal measurement from the PD, the PD signal measurement being based on (i) a first signal value read at a connection interface of the PD while a first load is applied by the PD to the channel and (ii) a second signal value read at the connection interface of the PD while a second load is applied by the PD to the channel in place of the first load.

5. A method as in claim 4 wherein:

the first signal value comprises a first voltage measurement and a first current measurement;

the second signal value comprises a second voltage measurement and a second current measurement; and performing the processing operation comprises subtracting the second voltage measurement from the first voltage measurement and dividing the difference by the first current measurement minus the second current measurement.

6. A method as in claim 2 wherein selecting further includes:

if a PD signal measurement is not available or if the PD is not capable of measuring local voltage and current for two different load values then:

if the PSE is capable of measuring local voltage and current for two different load values, then selecting as the input parameter the PSE signal measurement; otherwise if the PSE is capable of measuring local voltage and current for one load value and the PD is capable of reporting its power load, then selecting as the input parameter the PSE signal measurement and the PD signal measurement; otherwise selecting as the input parameter the PSE signal measurement.

7. A method as in claim 6 wherein receiving includes:

if the PD signal measurement is selected, obtaining the PD signal measurement from the PD, the PD signal measurement being based on a plurality of measurements taken at different loads, the plurality of measurements being used to eliminate any offset or gain errors.

8. A method as in claim 1 wherein selecting further includes choosing a method that is fastest among a variety of methods.

9. A method as in claim 1 wherein the method further comprises:

if the resistance is higher than a pre-determined value, instructing the PSE to cease applying power to the PD.

10. An apparatus comprising;

memory;

a network interface; and a controller, the controller configured to:

receive indication that a Power Sourcing Equipment (PSE) signal measurement is available from a PSE or a Powered Device (PD) signal measurement is available from a PD;

select, as an input parameter to a processing operation, at least one of the PSE signal measurement or the PD signal measurement; and perform the processing operation to calculate a resistance value indicative of a resistive power loss through the channel between the PSE and PD based on the input parameter;

wherein the controller is configured such that when it selects it is configured to choose a method for calculating resistance based on the availability of the PSE signal measurement and the PD signal measurement and pick an input parameter associated with the chosen method.

11. An apparatus as in claim 10 wherein the controller is configured such that when it selects it is further configured to choose a method that is most accurate among a variety of methods.

12. An apparatus as in claim 11 wherein the controller is configured such that when it chooses a method, if a PD signal measurement is available and if the PD is capable of measuring local voltage and current for two different load values, it is further configured to:

select as the input parameter the PD signal measurement.

13. An apparatus as in claim 12 wherein the controller is configured such that when it receives indication that the PSE signal measurement or PD signal measurement is available it is configured to:

obtain the PD signal measurement from the PD, the PD signal measurement being based on (i) a first signal value read at a connection interface of the PD while a first load is applied by the PD to the channel and (ii) a second signal value read at the connection interface of the PD while a second load is applied by the PD to the channel in place of the first load.

14. An apparatus as in claim 13 wherein:

the first signal value comprises a first voltage measurement and a first current measurement;

the second signal value comprises a second voltage measurement and a second current measurement; and the controller is configured such that when it performs the processing operation it is configured to subtract the second voltage measurement from the first voltage measurement and divide the difference by the first current measurement minus the second current measurement.

15. An apparatus as in claim 11 wherein the controller is configured such that when it chooses a method, if a PD signal measurement is not available or if the PD is not capable of measuring local voltage and current for two different load values, it is further configured to:

if the PSE is capable of measuring local voltage and current for two different load values, then select as the input parameter the PSE signal measurement; otherwise if the PSE is capable of measuring local voltage and current for one load value and the PD is capable of reporting its power load, then select as the input parameter the PSE signal measurement and the PD signal measurement; otherwise
select as the input parameter the PSE signal measurement.

16. An apparatus as in claim 15 wherein:
if the PD signal measurement is selected, the PD signal measurement is based on a plurality of measurements taken at different loads, the plurality of measurements being used to eliminate any offset or gain errors.

17. An apparatus as in claim 10 wherein the controller is configured such that when it selects it is further configured to choose a method that is fastest among a variety of methods.

18. An apparatus as in claim 10 wherein the controller is further configured to:
if the resistance is higher than a pre-determined value, instruct the PSE to cease applying power to the PD.

19. A method as in claim 1 wherein choosing the method comprises:
when the PD signal measurement is available and the PD is capable of measuring local voltage and current for two different load values, then:
selecting as the input parameter the PD signal measurement; and
choosing a first method for calculating resistive power;
otherwise, when the PSE is capable of providing power at multiple supply voltages and the PSE is capable of measuring local voltage and current for two different supply voltages, then:
selecting as the input parameter the PSE signal measurement; and
choosing a second method for calculating resistive power, the second method being different than the first method;
otherwise, when the PSE is capable of measuring local voltage and current for one supply voltage and the PD is capable of reporting its power load, then:
selecting as the input parameter both the PSE signal measurement and the PD signal measurement; and
choosing a third method for calculating resistive power, the third method being different than the first method and the second method; and otherwise:
selecting as the input parameter the PSE signal measurement; and
choosing a fourth method for calculating resistive power, the fourth method being different than the first method, the second method, and the third method.

* * * * *